US012724134B2

(12) United States Patent
Liu et al.

(10) Patent No.: US 12,724,134 B2
(45) Date of Patent: Sep. 1, 2026

(54) ULTRASONIC IMAGING SYSTEM AND ULTRASONIC IMAGING METHOD

(71) Applicant: Aco Healthcare Co., Ltd, Hsinchu City (TW)

(72) Inventors: Jian-Hung Liu, Hsinchu City (TW); Fu-Yen Kuo, Hsinchu City (TW); Tang-Chen Chang, Hsinchu City (TW)

(73) Assignee: Aco Healthcare Co., Ltd, Hsinchu City (TW)

( * ) Notice: Subject to any disclaimer, the term of this patent is extended or adjusted under 35 U.S.C. 154(b) by 920 days.

(21) Appl. No.: 18/146,384

(22) Filed: Dec. 25, 2022

(65) Prior Publication Data

US 2023/0136907 A1 May 4, 2023

Related U.S. Application Data

(63) Continuation-in-part of application No. 17/172,405, filed on Feb. 10, 2021, now abandoned.

(51) Int. Cl.
*G01S 7/52* (2006.01)
*G01S 15/89* (2006.01)

(52) U.S. Cl.
CPC ...... *G01S 7/52095* (2013.01); *G01S 15/8915* (2013.01)

(58) Field of Classification Search
None
See application file for complete search history.

(56) References Cited

U.S. PATENT DOCUMENTS

2015/0297183 A1* 10/2015 Freeman .............. A61B 8/4444 600/459
2015/0313575 A1* 11/2015 Tanaka ................ A61B 8/4444 600/447
2018/0003810 A1* 1/2018 Freeman ............. G01S 15/8915
2018/0192999 A1* 7/2018 Song .................... A61B 8/4405
2020/0022677 A1* 1/2020 Takano ................ A61B 8/4444
2020/0107815 A1* 4/2020 Chiang .................... A61B 8/14

* cited by examiner

*Primary Examiner* — Isam A Alsomiri
*Assistant Examiner* — Joseph C Fritchman
(74) *Attorney, Agent, or Firm* — Li & Cai Intellectual Property Office

(57) ABSTRACT

An ultrasonic imaging system and an ultrasonic imaging method are provided. The ultrasonic imaging system includes a transmitting beamformer, a receiving beamformer, transducer elements and a controller unit. In a transmitting process, the controller circuit controls the transmitting beamformer to transmit ultrasonic sound signals. In a receiving process, echo signals are received at the transducer elements, the controller unit applies a common fine delay set to the echo signals by controlling a common fine delay beamformer of the receiving beamformer, the delayed echo signals are summed to generate first summation signals, the controller unit further applies compensated coarse delay sets to the first summation signals by controlling coarse delay beamformers of the receiving beamformer, and the delayed first summation signals are summed to generate output beam signals.

12 Claims, 12 Drawing Sheets

ULTRASONIC IMAGING SYSTEM AND ULTRASONIC IMAGING METHOD

CROSS-REFERENCE TO RELATED PATENT APPLICATION

This application is a continuation-in-part application of the U.S. application Ser. No. 17/172,405, filed on Feb. 10, 2021 and entitled "A STRUCTURE AND A PROCESSING METHOD OF SYSTEM WITH MULTI-BEAM AND MICRO-BEAMFORMING", now pending, the entire disclosures of which are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a system and a method, and more particularly to an ultrasonic imaging system and an ultrasonic imaging method.

BACKGROUND OF THE DISCLOSURE

In an existing ultrasonic imaging system, a multi-line beamformer is utilized. As shown in FIG. 1, a micro-beamformer controller 40 receives control signals over one or more lines 42 from a main system, and controls magnitudes of the applied delays through a delay control section as indicated by delay control lines 44. A switch matrix 32 contains switches which are each coupled to receive signals from a respective delay DL, and a patch switch controller 26 controls a switch matrix 32 to couple channel signals utilized by individual scan lines in multi-line imaging are coupled to different summing nodes for multi-line processing.

However, in order to increase a frame rate of image scanning in such multi-beam imaging architecture, it is necessary to add more micro-beamformers to achieve parallel processing for multi-line imaging. Although the frame rate can be improved, a complexity of the hardware also increases, making it difficult to achieve miniaturization.

SUMMARY OF THE DISCLOSURE

In response to the above-referenced technical inadequacies, the present disclosure provides an ultrasonic imaging system and an ultrasonic imaging method capable of reducing architecture complexity for multi-beam beamforming system.

In order to solve the above-mentioned problems, one of the technical aspects adopted by the present disclosure is to provide an ultrasonic imaging system, including a transmitting beamformer, a receiving beamformer, a plurality of transducer elements corresponding to a plurality of receiving channels and selectively connected to the transmitting beamformer or the receiving beamformer, and a controller circuit connected to the transmitting beamformer and the receiving beamformer. In a transmitting process, the controller circuit is configured to control the transmitting beamformer to transmit a plurality of ultrasonic sound signals that focus at scan depths through the transducer elements. The receiving beamformer is configured to generate a plurality of output beam signals and includes a common fine delay beamformer and a plurality of coarse delay beamformers. The common fine delay beamformer includes a plurality of channel groups, each of channel group corresponding to a part of the receiving channels and including a plurality of fine delay circuits and a first summation unit. The plurality of coarse delay beamformers respectively correspond to the output beam signals and each includes a plurality of coarse delay circuits connected to multiple ones of the first summation unit, and a second summation unit connected to the coarse delay circuits. In the receiving process, echo signals of the ultrasonic sound signal are received at the transducer elements and transmitted to the channel groups, the controller unit applies a common fine delay set to the echo signals by controlling the common fine delay beamformer, multiple ones of the first summation unit perform first summation operations on the corresponding echo signals to generate a plurality of first summation signals, the controller unit applies a plurality of compensated coarse delay sets to the first summation signals by controlling the coarse delay beamformers, and multiple ones of the second summation unit perform second summation operations the corresponding delayed first summation signals to generate a plurality of output beam signals.

In order to solve the above-mentioned problems, another one of the technical aspects adopted by the present disclosure is to provide an ultrasonic imaging method, suitable for the ultrasonic imaging system including a transmitting beamformer, a receiving beamformer, a plurality of transducer elements corresponding to a plurality of receiving channels and selectively connected to the transmitting beamformer or the receiving beamformer, and a controller circuit connected to the transmitting beamformer and the receiving beamformer, the ultrasonic imaging method including: configuring the controller circuit to, in a transmitting process, control the transmitting beamformer to transmit a plurality of ultrasonic sound signals that focus at scan depths through the transducer elements, in which the receiving beamformer includes a common fine delay beamformer including a plurality of channel groups, each of channel group corresponding to a part of the receiving channels and including a plurality of fine delay circuits and a first summation unit, and a plurality of coarse delay beamformers respectively corresponding to the output beam signals. Each of the coarse delay beamformers includes a plurality of coarse delay circuits connected to multiple ones of the first summation unit and a second summation unit connected to the coarse delay circuits. The ultrasonic imaging method further includes: configuring the transducer elements to, in a receiving process, receive echo signals of the ultrasonic sound signals and send the echo signals to the channel groups; configuring the controller unit to apply a common fine delay set to the echo signals by controlling the common fine delay beamformer; configuring multiple ones of the first summation unit to perform first summation operations on the corresponding echo signals to generate a plurality of first summation signals; configuring the controller unit to apply a plurality of compensated coarse delay sets to the first summation signals by controlling the coarse delay beamformers; and configuring multiple ones of the second summation unit to perform second summation operations on the corresponding delayed first summation signals, so as to generate a plurality of output beam signals.

Therefore, in the ultrasonic imaging system and the ultrasonic imaging method provided by the present disclosure, a system architecture that combines single common fine delay beamformer with multiple coarse delay beamformers is utilized, such that multiple output beam signals can be simultaneously generated by adjusting a common fine delay set and assigning compensated coarse delays for each of the beam signals, thereby decreasing an architecture complexity for multi-beam beamforming system without adding more micro-beamformers, so as to achieve miniaturization.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
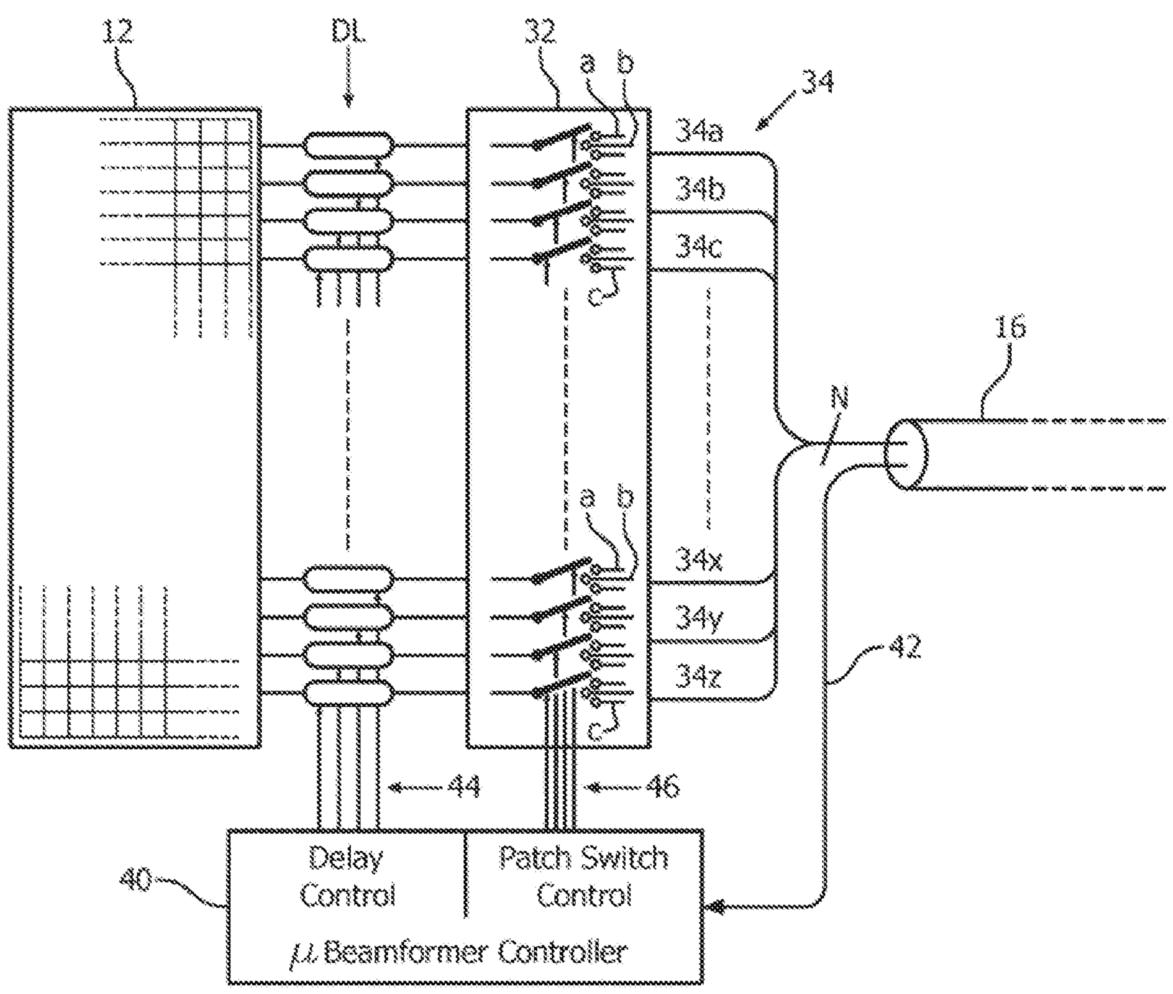
FIG. 1 is a schematic view of an existing ultrasonic imaging system that utilizes a multi-beam beamformer.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
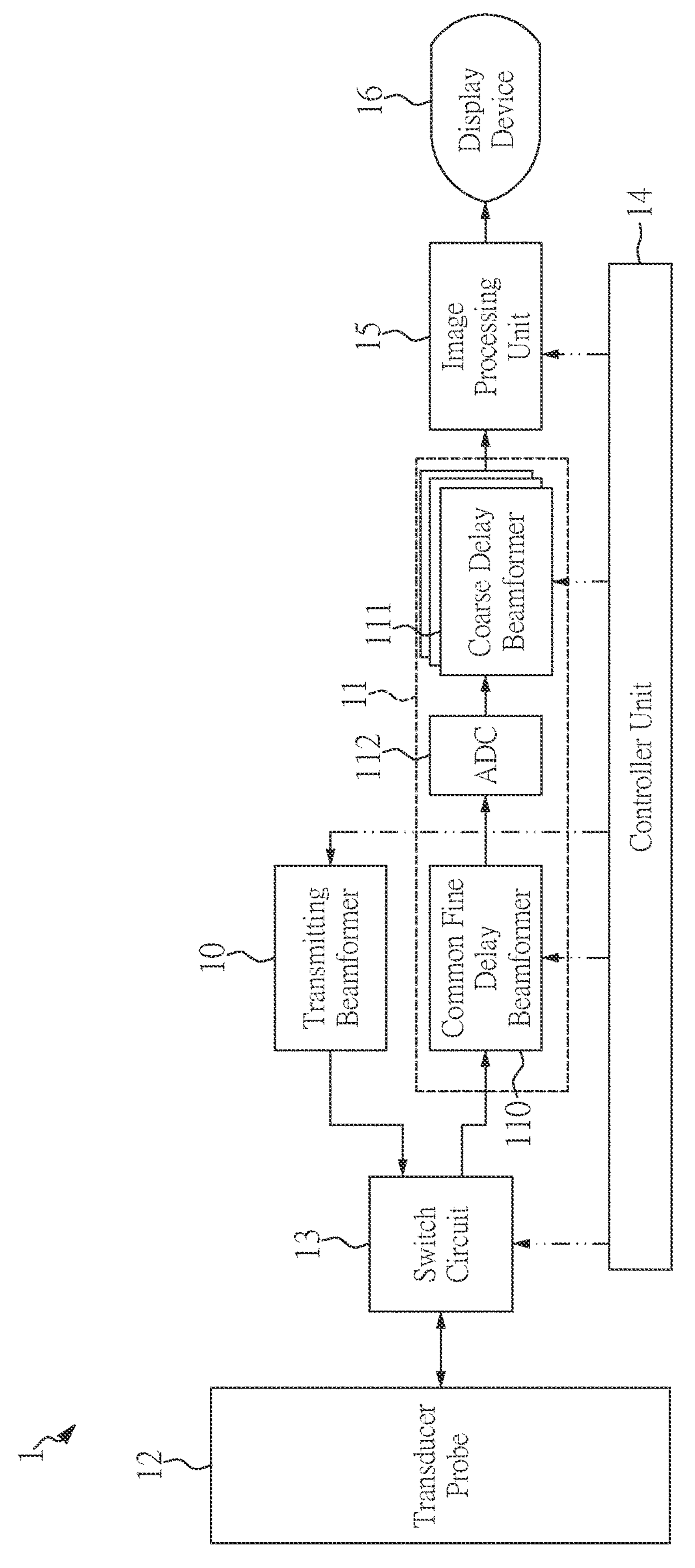
FIG. 2 is a functional block diagram of an ultrasonic imaging system according to one embodiment of the present disclosure.

FIG. 2 is a functional block diagram of an ultrasonic imaging system according to one embodiment of the present disclosure. Referring to FIG. 2, one embodiment of the present disclosure provides an ultrasonic imaging system 1, which includes a transmitting beamformer 10, a receiving beamformer 11, a transducer probe 12, a switch circuit 13, a controller unit 14, an image processing unit 15 and a display device 16.

As shown in FIG. 2, the switch circuit 13 is connected between the transducer probe 12 and the transmitting beamformer 10, and is connected between the transducer probe 12 and the receiving beamformer 11. The controller unit 14 is connected to the transmitting beamformer 10, the receiving beamformer 11, the switch circuit 13, the image processing unit 15 and the display device 16. The controller unit 14 can include, for example, a central processing unit (CPU), a digital signal processor (DSP), or any other integrate circuit that can be used to perform functions of the controller unit 13 mentioned hereinafter. Specifically, the controller unit 14 can further include one or more memory units that store multiple of computer readable instructions, which are executed by the CPU or the DSP to perform various calculations, controls and apply settings for beam focusing processing, signal processing and image processing utilized in the ultrasonic imaging system 1 provided by the present disclosure.

The transducer probe 12 can be an ultrasound transducer probe, which typically includes arrays of transducer elements, such as small piezoelectric elements or crystal elements. In some embodiments, a subset of the transducer elements in an array are used to transmit or receive an ultrasound beam. The transducer elements corresponding to a plurality of receiving channels and a plurality of transmitting channels, and can be selectively connected to the transmitting beamformer 10 or the receiving beamformer 11 through the switch circuit 13.

Figure 3:
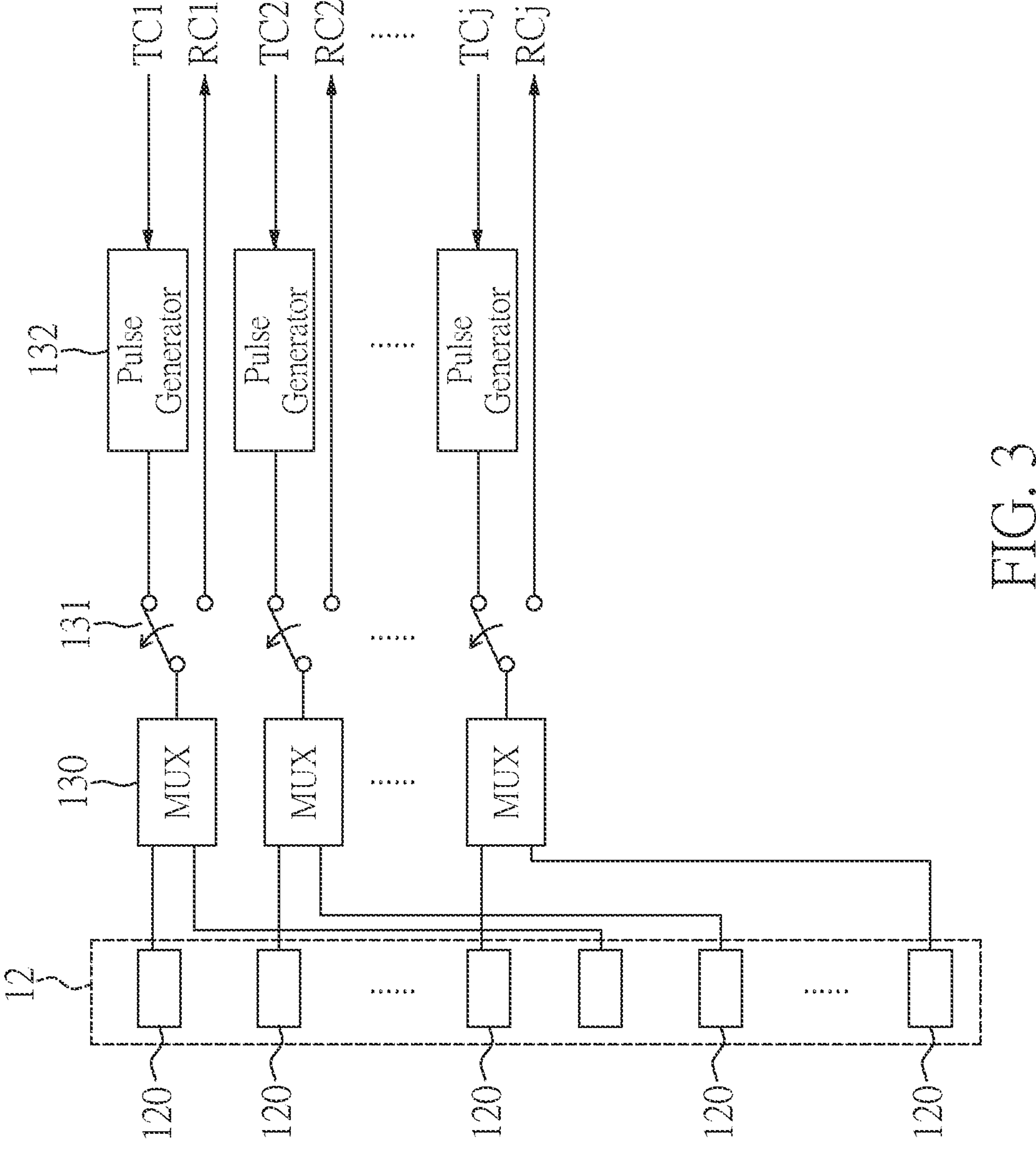
FIG. 3 is a detailed schematic circuit layout showing the transducer elements and the switch circuit according to one embodiment of the present disclosure.

Reference can be made to FIG. 3, which is a detailed schematic circuit layout showing the transducer elements and the switch circuit according to one embodiment of the present disclosure.

In some embodiments, when the number of the transducer elements 120 at the front end is greater than the number of channels available for the transmitting beamformer 10 and the receiving beamformer 11, multiplexers and transmitting and receiving (T/R) switches can be provided for channel selection and transmitting/receiving switching. As shown in FIG. 3, the switch circuit 13 can include a plurality of multiplexers 130 each connected to one or more transducer elements 120, and a plurality of T/R switches 131 connected to the plurality of multiplexers 130, respectively, and thus the transducer elements 120 can be operable to both emit ultrasound signals and receive echo signals in such architecture.

Moreover, each of the T/R switches 131 can provide one transmitting channel (e.g., transmitting channel TC1, TC2, . . . , or TCj) to the transmitting beamformer 10 and one receiving channel (e.g., receiving channel RC1, RC2, . . . , or RCj) to the receiving beamformer 110. In certain embodiments, quantities of the multiplexer 130, the T/R switches 131, the transmitting channels TC1, TC2, . . . , TCj and the receiving channels RC1, RC2, . . . , RCj can be the same, which is "j" denoted in FIG. 3. Specifically, j is an integer that is larger than or equal to 1, such as 64, but the present disclosure is not limited thereto.

The T/R switches can be, for example, single pole dual throw (SPDT) switches, each of which can be controlled by the controller unit 14 to selectively connect the corresponding multiplexer 130 to the transmitting beamformer 10 in a transmitting process or to the receiving beamformer 11 in a receiving process.

The transmitting beamformer 10 can include, for example, one or more signal sources (e.g., voltage or current sources) and multiple delay circuits connected to the transmitting channels, respectively. In the transmitting process, the controller unit 14 can configure the delay circuits of the transmitting beamformer 10 to apply beam focusing delays on transmitting signals output through the transmitting channels. Specifically, the applied beam focusing delays are delays required for transmitting signals that are output through the transmitting channels, and can be calculated and obtained according to positions (e.g., scan depths) of set focusing points.

The controller unit 14 can further configure the transmitting beamformer 10 to energize the transducer elements 120 to produce a burst of ultrasonic energy, so as to form the ultrasonic sound signals, and the ultrasonic sound signals emitted by the transducer units 120 can therefore be focused on the set focus point.

As further shown in FIG. 3, a plurality of pulse generators 132 can be provided for the transmitting channels TC1, TC2, . . . , TCj, which are configured to boost the delayed transmitting signals into pulses with high voltages, such that the transducer elements 120 can be energized to transmit the ultrasonic sound signals with sufficient ultrasonic energy.

For the receiving beamformer with multiple receiving channels, the beam focusing delays used have obvious differences among different scan depths. Therefore, when the control unit 14 executes a dynamic receiving focusing process, different delay settings should be applied in the receiving channels according to the scan depths used, and then a summation process is performed. Therefore, the receiving beamformer 11 generally consumes more software and hardware resources than the transmitting beamformer 10.

Furthermore, when the beam focusing delays applied to the receiving channels vary within a large difference range, the receiving beamformer 11 needs to be equipped with delay circuits that can provide wide ranges of delay adjustment, however, such delay circuits may occupy large usage area and may be difficult to achieve miniaturization.

Therefore, the receiving beamformer 11 in the present disclosure is provided partially based on an existing micro-beamforming architecture. As shown in FIG. 2, the receiving beamformer 11 can include a common fine delay beamformer 110 and a plurality of coarse delay beamformers 111.

Figure 4:
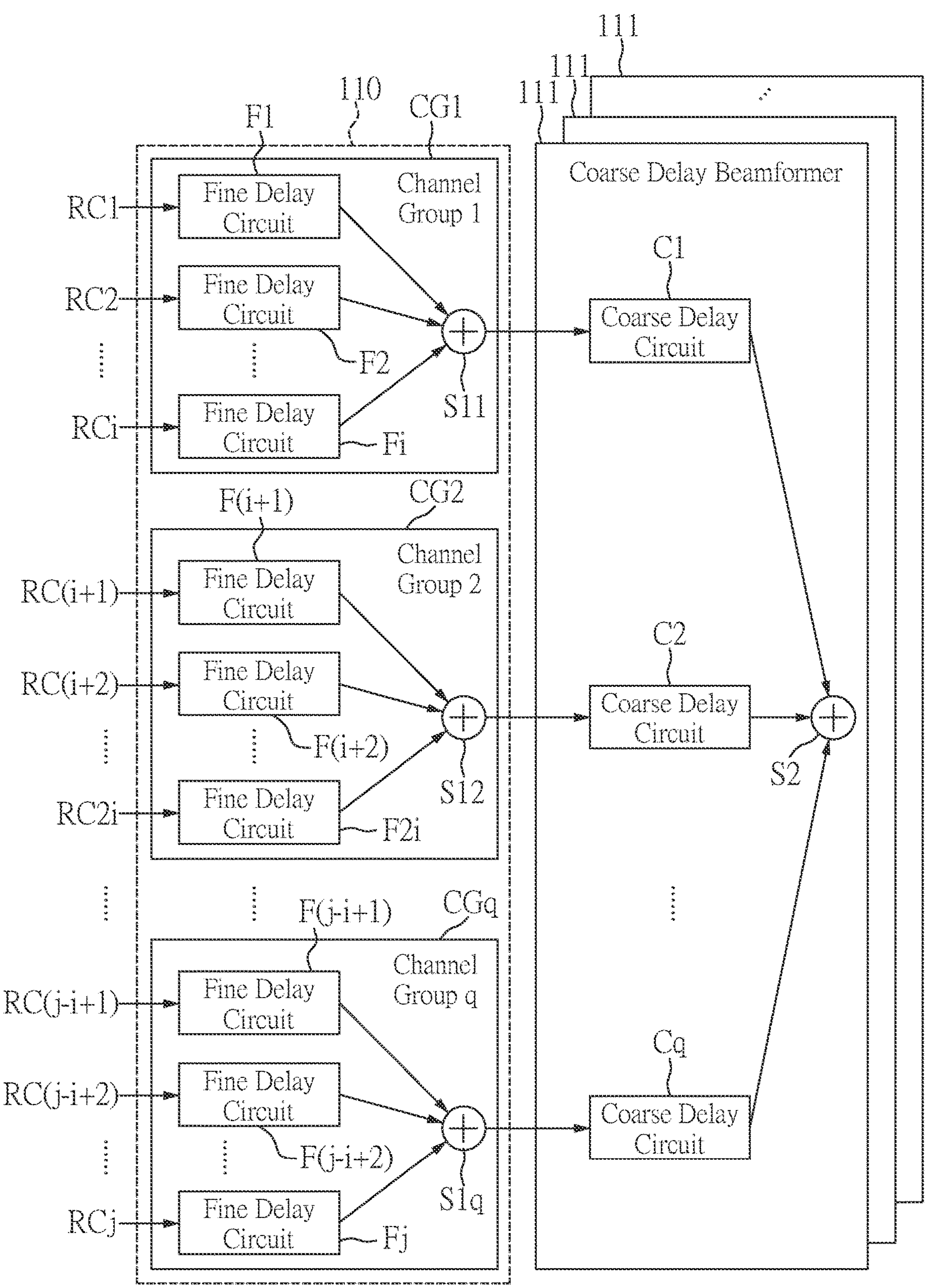
FIG. 4 is a schematic diagram showing details of a common fine delay beamformer and multiple coarse delay beamformers according to one embodiment of the present disclosure.

Reference can be further made to FIG. 4, which is a schematic diagram showing details of a common fine delay beamformer and multiple coarse delay beamformers according to one embodiment of the present disclosure.

As shown, the receiving beamformer 11 is used to generate a plurality of output beam signals for ultrasonic imaging, the common fine delay beamformer includes a plurality of channel groups CG1 to CGq, that is, channel group 1 to channel group q denoted in FIG. 4. Each of channel group corresponding to a part of the receiving channels, for example, the channel group CG1 correspond to the receiving channels RC1 to RCi, the channel group CG2 correspond to the receiving channels RC(i+1) to RC2*i*, and so forth, however, the aforementioned description for the channel groups is merely an example, and is not meant to limit the scope of the present disclosure.

Furthermore, each of channel group includes a plurality of fine delay circuits and a first summation unit, for example, the channel group CG1 includes fine delay circuits F1 to Fi and the first summation unit S11. The fine delay circuits F1 to Fi can be controlled to adjust delays applied on corresponding receiving channels RC1 to RCi. The first summation unit S11 is connected to the fine delay circuits F1 to Fi and performs a summation operation for the delayed echo signals from the fine delay circuits F1 to Fi.

In addition, each of the coarse delay beamformers 111 includes a plurality of coarse delay circuits C1 to Cq and a second summation unit S2. The coarse delay circuits C1 to Cq are connected to the first summation units S11 to S1*q*.

It should be noted that, the existing micro-beamforming architecture is typically formed of one fine delay circuit similar to the common fine delay circuit 110 and one coarse delay circuit similar to one of the coarse delay beamformers 111 mentioned above. Such architecture divides the receiving channels into several channel groups, and disassembles the beam focusing delay of each channel required for beam focusing into a fine delay and a coarse delay. In each channel group, the fine delays with small range of delays are applied and a signal summation is performed, thereby reducing the number of channels that need to be processed, and then the coarse delays with large range of delays are applied and another set of signal summations are performed on the summed signals of each channel group. Finally, calculations of beam focusing delays and signal summation required for beam focusing on each channel is completed.

Although the existing micro-beamforming architecture enables the circuit implementing fine delay beamforming to achieve small-scale delay processing in a smaller area and reduces the amount of data to be processed for the coarse delay beamforming, such architecture is not suitable for multi-beam processing.

Figure 5:
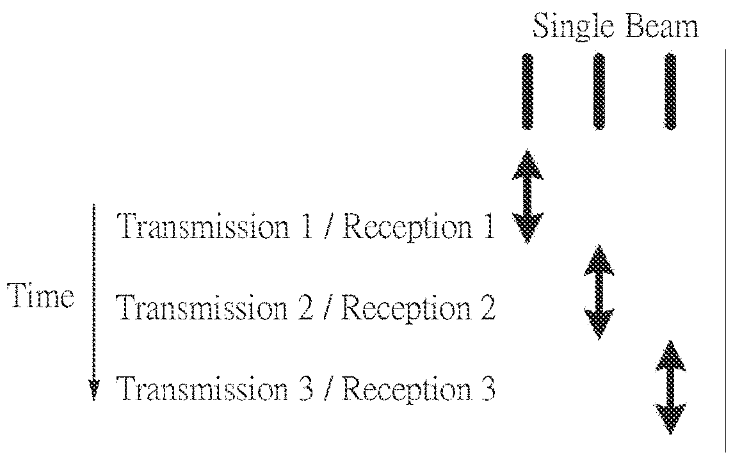
FIG. 5 is a schematic diagram showing concepts of multi-beam processing.
Figure 5:
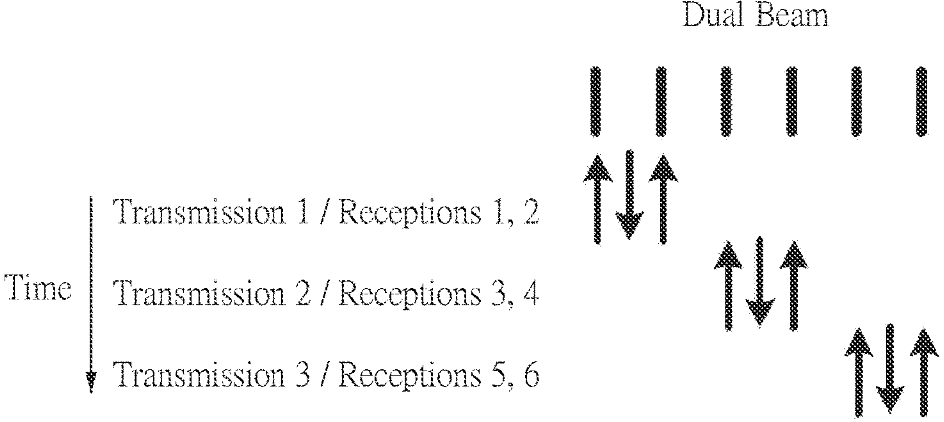
Figure 5:
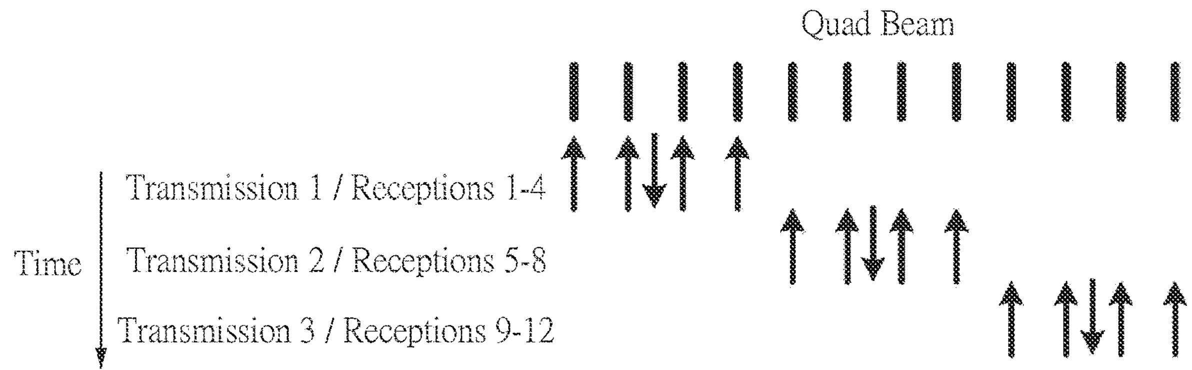

Reference is made to FIG. 5, which is a schematic diagram showing concepts of multi-beam processing. In order to increase a frame rate of ultrasonic scanning image, multi-beam imaging is usually used for beam focusing processing. In this method, beam focusing processes of multiple scanning lines are simultaneously performed in the receiving beamformer in response to a single beam (the ultrasonic sound signal mentioned above) being emitted. As shown in FIG. 5, different processing manners are provided, such as single-transmission-single-reception (referred to as Single beam hereinafter), single-transmission-double-receptions (referred to as Dual beam) and single-transmission-four-receptions (referred to as Quad beam). As can be seen, an amount of beam focusing processes that need to be simultaneously performed increases as the frame rate displayed on the scanning image.

Figure 6:
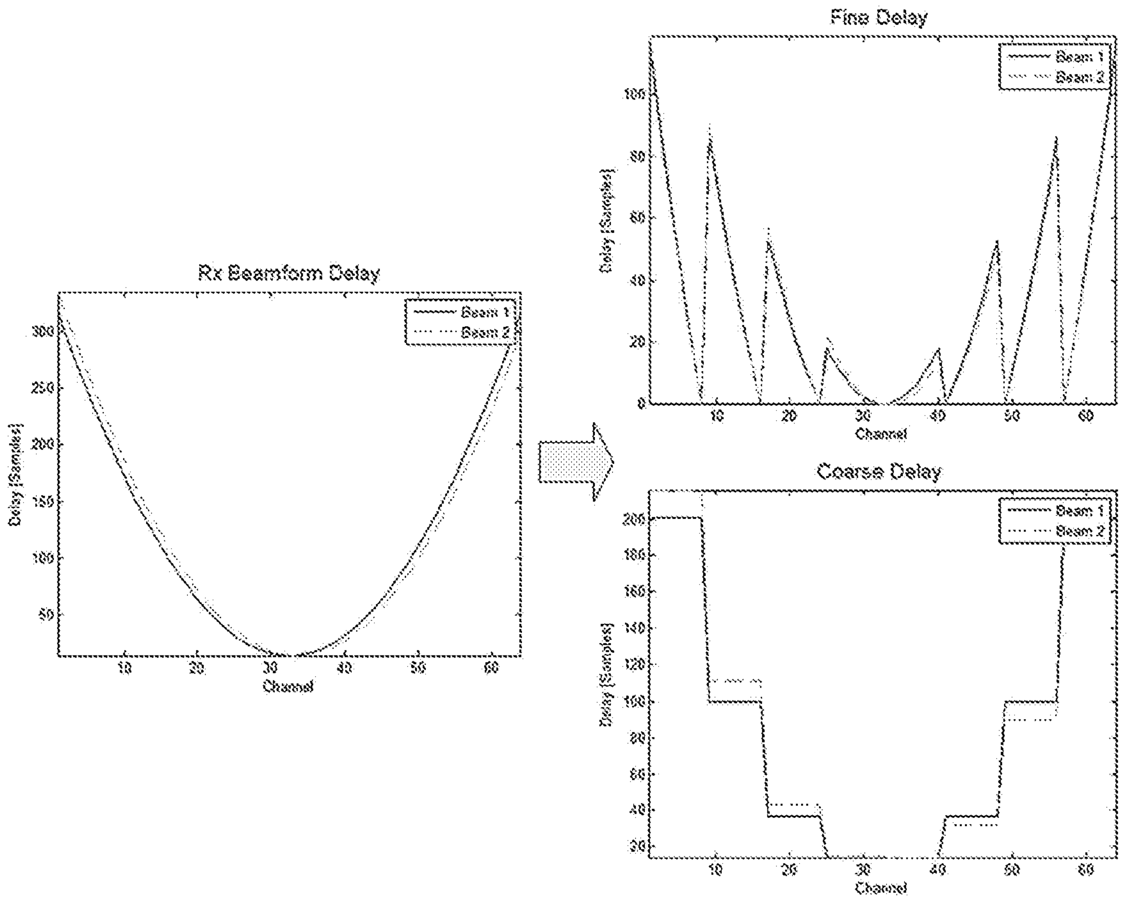
FIG. 6 shows plot diagrams of ideal beamforming delays, fine delays and coarse delays for Dual beam condition according to one embodiment of the present disclosure.

Reference is made to FIG. 6, which shows plot diagrams of ideal beamforming delays, fine delays and coarse delays for Dual beam condition according to one embodiment of the present disclosure. Since the echo signals of Beam1 and Beam2 come from the same receiving channels, but delays required by Beam1 and Beam2 in each channel are different, therefore, it is necessary to use two sets of fine delay beamformers and coarse delay beamformers in the system to achieve simultaneous beam focusing for Beam 1 and Beam 2. That is, ideal delays for Beam 1 and Beam 2 are different, such that fine delays and coarse delays applied for Beam 1 are different from those applied for Beam 2, as shown in FIG. 6. Under the quad beam condition, four sets of focus delay processing of fine delays and coarse delays should be further performed, that greatly increases system complexity and hardware costs and sizes.

Figure 7:
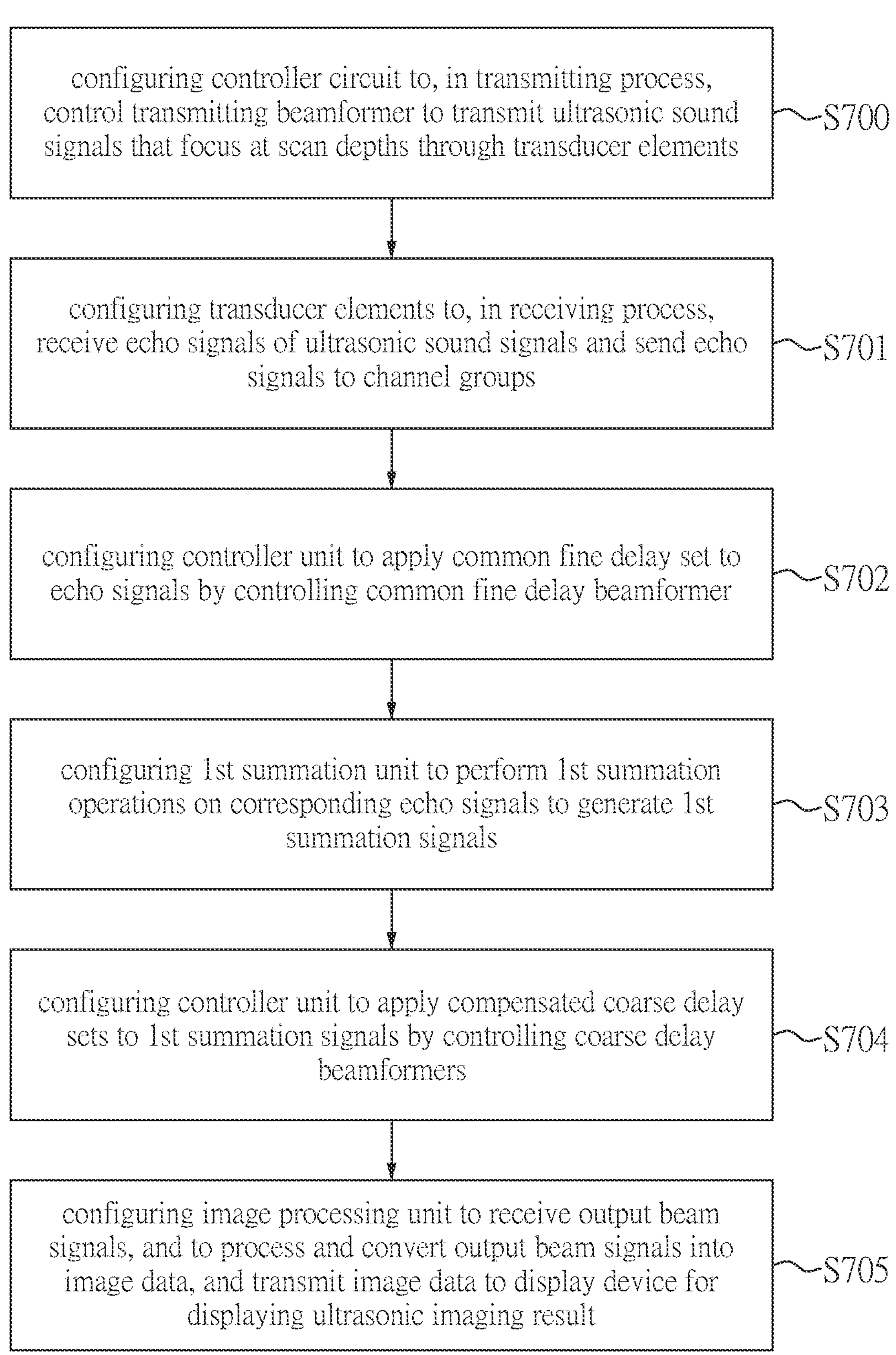
FIG. 7 is a flowchart of the ultrasonic imaging method according to one embodiment of the present disclosure.

Therefore, the present disclosure provides an ultrasonic imaging method for the above-mentioned multi-beam conditions. FIG. 7 is a flowchart of the ultrasonic imaging method according to one embodiment of the present disclosure. Reference is made to FIG. 7, the ultrasonic imaging method provided by the present disclosure is suitable for the ultrasonic imaging system 1, and includes the following steps:

Step S700: configuring the controller circuit to, in a transmitting process, control the transmitting beamformer to transmit a plurality of ultrasonic sound signals that focus at scan depths through the transducer elements.

Step S701: configuring the transducer elements to, in a receiving process, receive echo signals of the ultrasonic sound signals and send the echo signals to the channel groups.

Step S702: configuring the controller unit to apply a common fine delay set to the echo signals by controlling the common fine delay beamformer.

Figure 8:
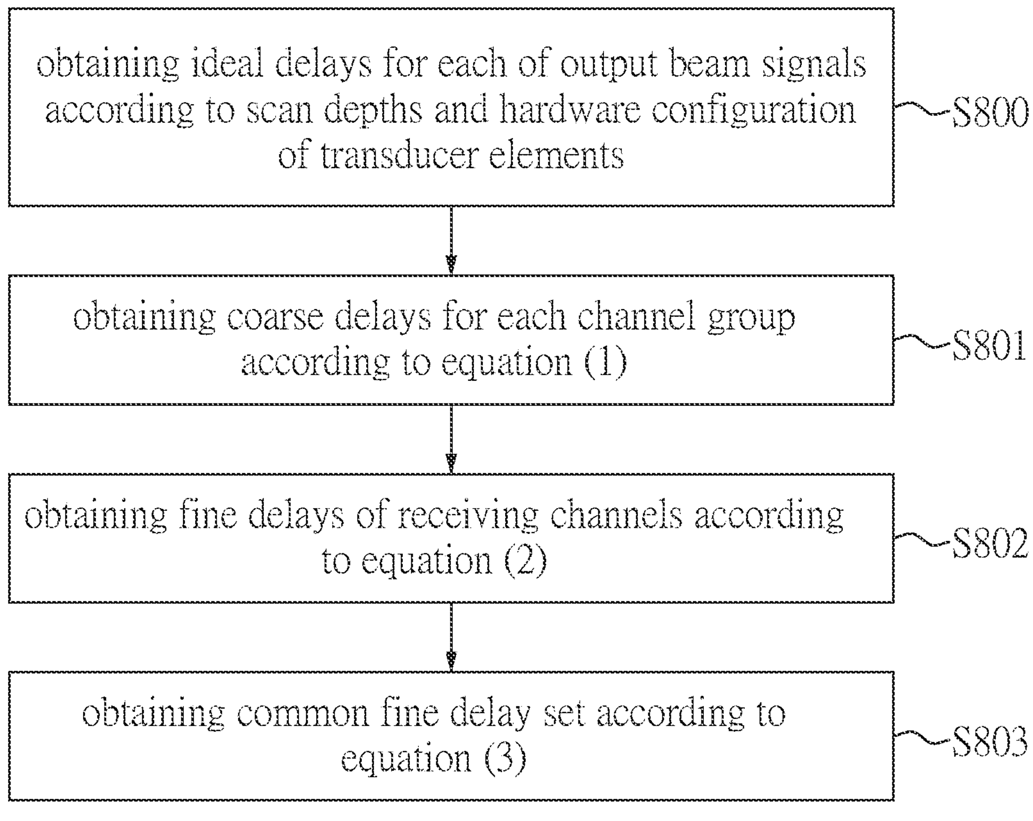
FIG. 8 is a first flowchart of a multi-beam calculation process according to one embodiment of the present disclosure.
Figure 9:
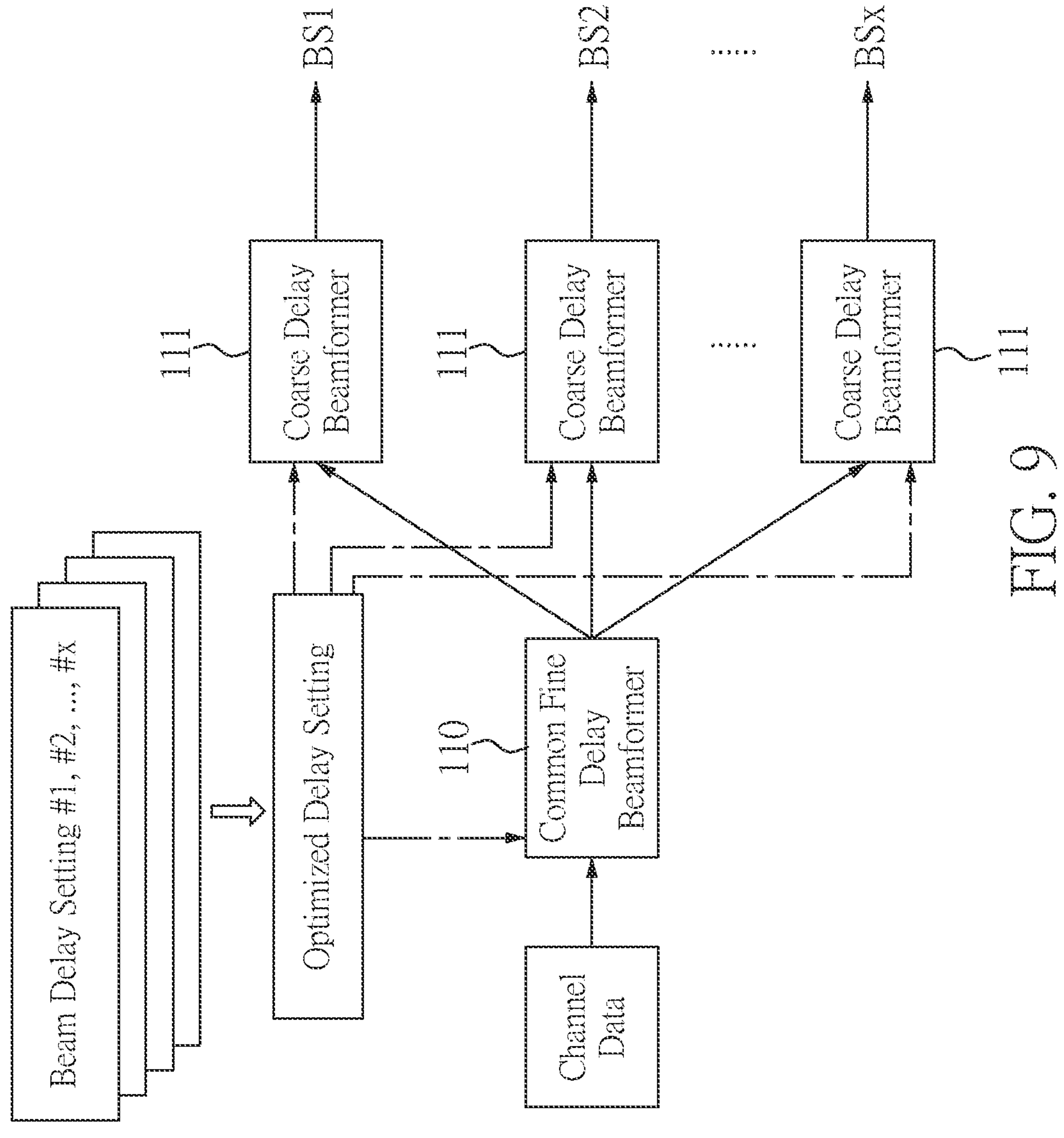
FIG. 9 is a schematic diagram showing a manner in which optimized delay settings are applied to the common fine delay beamformer and the coarse delay beamformers according to one embodiment of the present disclosure.

Before step S702 is performed, the common fine delay can be determined first. Reference is made to FIGS. 8 and 9, FIG. 8 is a first flowchart of a multi-beam calculation process according to one embodiment of the present disclosure, and FIG. 9 is a schematic diagram showing a manner in which optimized delay settings are applied to the common fine delay beamformer and the coarse delay beamformers according to one embodiment of the present disclosure.

In some embodiments, the controller unit 14 can be further configured to perform a multi-beam calculation process to determine the common fine delay set, or the common fine delay set corresponding to the different output beam signals can be designed according to a plurality of different scan ranges and a hardware specification of the transducer elements (such as pitch size and radius of curvature), so as to establish a lookup table, and the controller unit 14 can be configured to apply the common fine delay set by controlling the common fine delay beamformer according to the lookup table.

As shown in FIG. 8, the multi-beam calculation process includes:

Step S800: obtaining a plurality of ideal delays for each of the output beam signals according to the scan depths and a hardware configuration of the plurality of transducer elements. The ideal delays of each of output beam signals can be calculated according to set scan depths along a scan axis, and hardware parameters (e.g., pitch size, radius of curvature of transducer elements 120) of the ultrasonic transducer probe 12.

Step S801: obtaining a plurality of coarse delays for each channel group according to an equation (1):

$$\text{CoarseDelay}(k) \leq \min\{\text{BeamformDelay}(n)\} \quad \text{equation (1);}$$

where n is a channel number of the receiving channel of a kth one of the channel groups, CoarseDelay (k) is the coarse delay of the kth one of the channel groups, BeamformDelay (n) is the ideal delay of the nth one of the receiving channels, and k and n are integers equal to or larger than 1

Step S802: obtaining a plurality of fine delays of the plurality of receiving channels according to an equation (2):

$$\text{FineDelay}(n) = \text{BeamformDelay}(n) - \text{CoarseDelay}(k) \quad \text{equation (2);}$$

where FineDelay (n) is the fine delay of the nth of the receiving channels.

Step S803: obtaining the common fine delay set according to an equation (3):

$$\text{CommonFineDelay}(n) = f(\text{FineDelayBeam\_1}(n), \text{FineDelayBeam\_2}(n), \ldots, \text{FineDelayBeam\_}x(n)), \text{ where } \min(\text{FineDelayBeam\_1}(n), \text{FineDelayBeam\_2}(n), \ldots, \text{FineDelayBeam\_}x) \leq f(\text{FineDelayBeam\_1}(n), \text{FineDelayBeam\_2}(n), \ldots, \text{FineDelayBeam\_}x) \leq \max(\text{FineDelayBeam\_1}(n), \text{FineDelayBeam\_2}(n), \ldots, \text{FineDelayBeam\_}x) \quad \text{equation (3);}$$

where CommonFineDelay (n) is a common fine delay of nth one of the receiving channels, FineDelayBeam_1 (n), FineDelayBeam_2 (n), . . . , FineDelayBeam_x (n) are the fine delays of nth one of the receiving channels of first to xth ones of the output beam signals, and f(.) can be a linear function or non-linear function, x is an integer equals to or larger than 1, the common fine delay set includes CommonFineDelay (1), CommonFineDelay (2), . . . , CommonFineDelay (j), and j is a quantity of the receiving channels.

Figure 10:
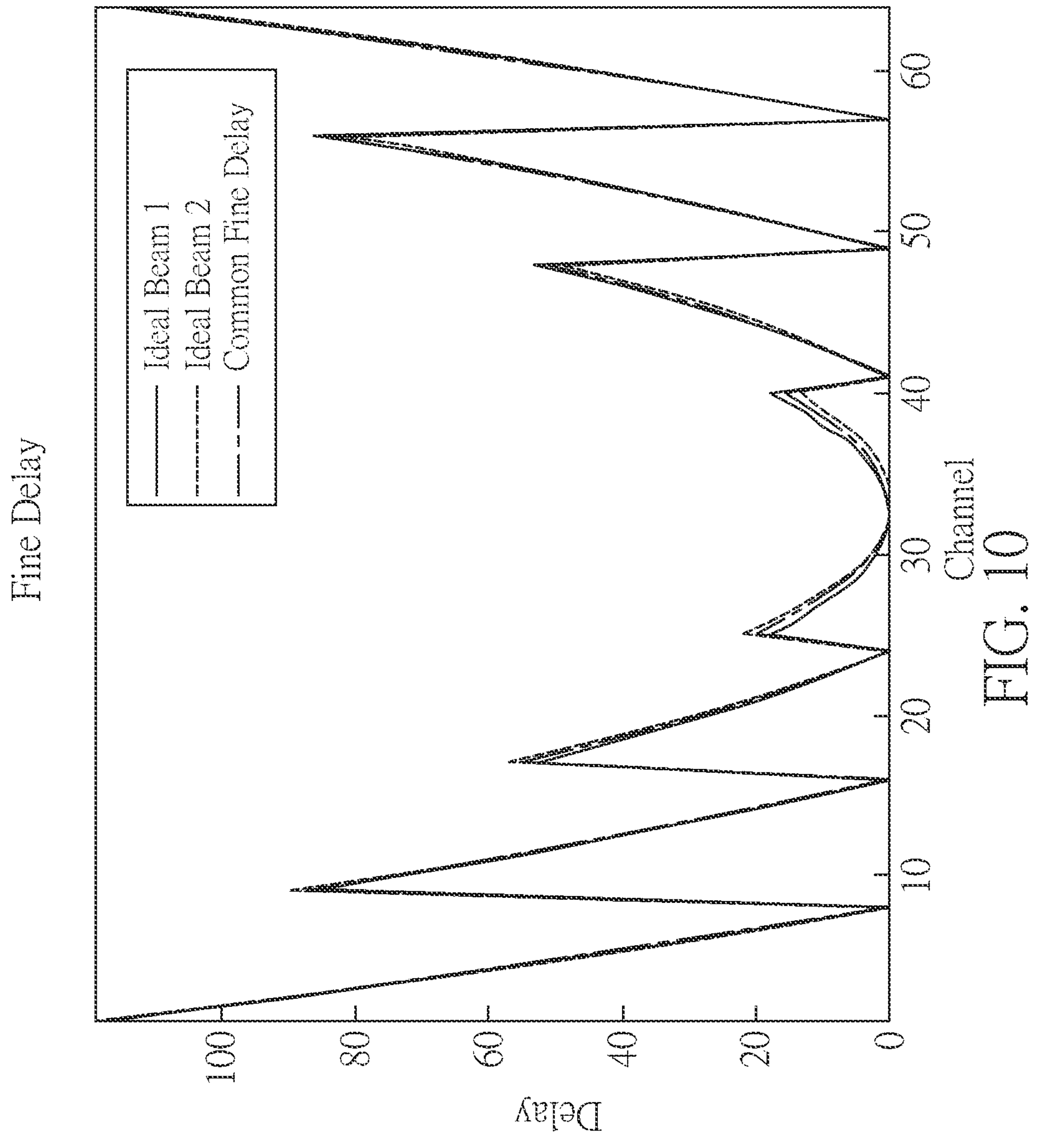
FIG. 10, which is a plot diagram showing calculation results of the common fine delay set in the Dual beam condition according to one embodiment of the present disclosure.

Reference can be made to FIG. 10, which is a plot diagram showing calculation results of the common fine delay set in the Dual beam condition according to one embodiment of the present disclosure. It can be seen from FIG. 10 that, different from the existing micro-beamforming architecture, the common fine delay set in the present disclosure can be utilized for all of the output beam signals, therefore, only one fine delay beamformer (i.e., the common fine delay beamformer) is needed for simultaneous multi-beam processing.

Step S703: configuring the first summation unit to perform first summation operations on the corresponding echo signals to generate a plurality of first summation signals.

Similar to the existing micro-beamforming architecture, this step is performed to effectively decrease amount of channel data that need to be processed.

Step S704: configuring the controller unit to apply a plurality of compensated coarse delay sets to the first summation signals by controlling the coarse delay beamformers.

Figure 11:
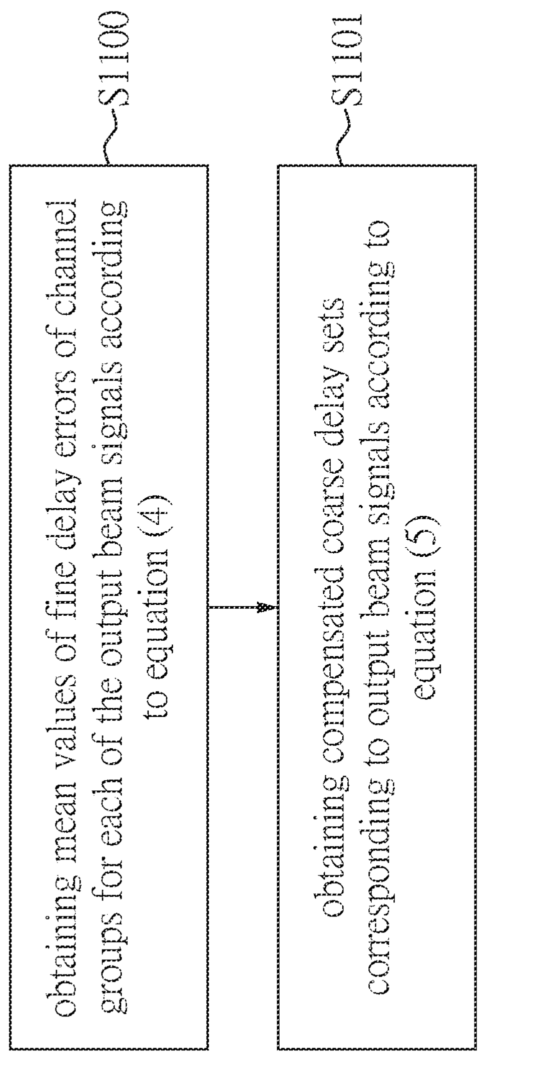
FIG. 11 is a second flowchart of a multi-beam calculation process according to one embodiment of the present disclosure.

Before step S704 is performed, the compensated coarse delay sets should be determined first. Reference is made to FIG. 11, which is a second flowchart of a multi-beam calculation process according to one embodiment of the present disclosure.

In some embodiments, the controller unit 14 can be further configured to perform the multi-beam calculation process to determine the compensated coarse delay sets, or the compensated coarse delay sets corresponding to the different output beam signals can be designed according to the different scan ranges and the hardware specification of the transducer elements, so as to establish the lookup table, and the controller unit 14 can be configured to apply the compensated coarse delay sets by controlling the coarse delay beamformers according to the lookup table.

As shown in FIG. 11, the multi-beam calculation process further includes:

Step S1100: obtaining mean values of fine delay errors of the plurality of channel groups for each of the output beam signals according to an equation (4):

$$\text{MeanOfFineDelayErrorBeam\_}x\ (k)=\text{mean}\{\text{FineDelayBeam\_}x\ (n)-\text{CommonFineDelay}\ (n)\} \quad \text{equation (4)},$$

where MeanOfFineDelayErrorBeam_x (k) is the mean value of the kth one of the channel groups of the xth one of the output beam signals.

Step S1101: obtaining the plurality of compensated coarse delay sets corresponding to the output beam signals according to an equation (5):

$$\text{CompensatedCoarseDelayBeam\_}x\ (k)=\text{CoarseDelayBeam\_}x\ (k)+\text{MeanOfFineDelayErrorBeam\_}x\ (k) \quad \text{equation (5)};$$

where CompensatedCoarseDelayBeam_x (k) a compensated coarse delay of the kth one of the channel groups corresponding to the xth one of the output beam signals, and the compensated coarse delay set corresponding to the xth one of the output beam signals includes CompensatedCoarseDelayBeam_x (1), CompensatedCoarseDelayBeam_x (2), . . . , CompensatedCoarseDelayBeam_x (q), where q is a quantity of the channel groups.

Figure 12:
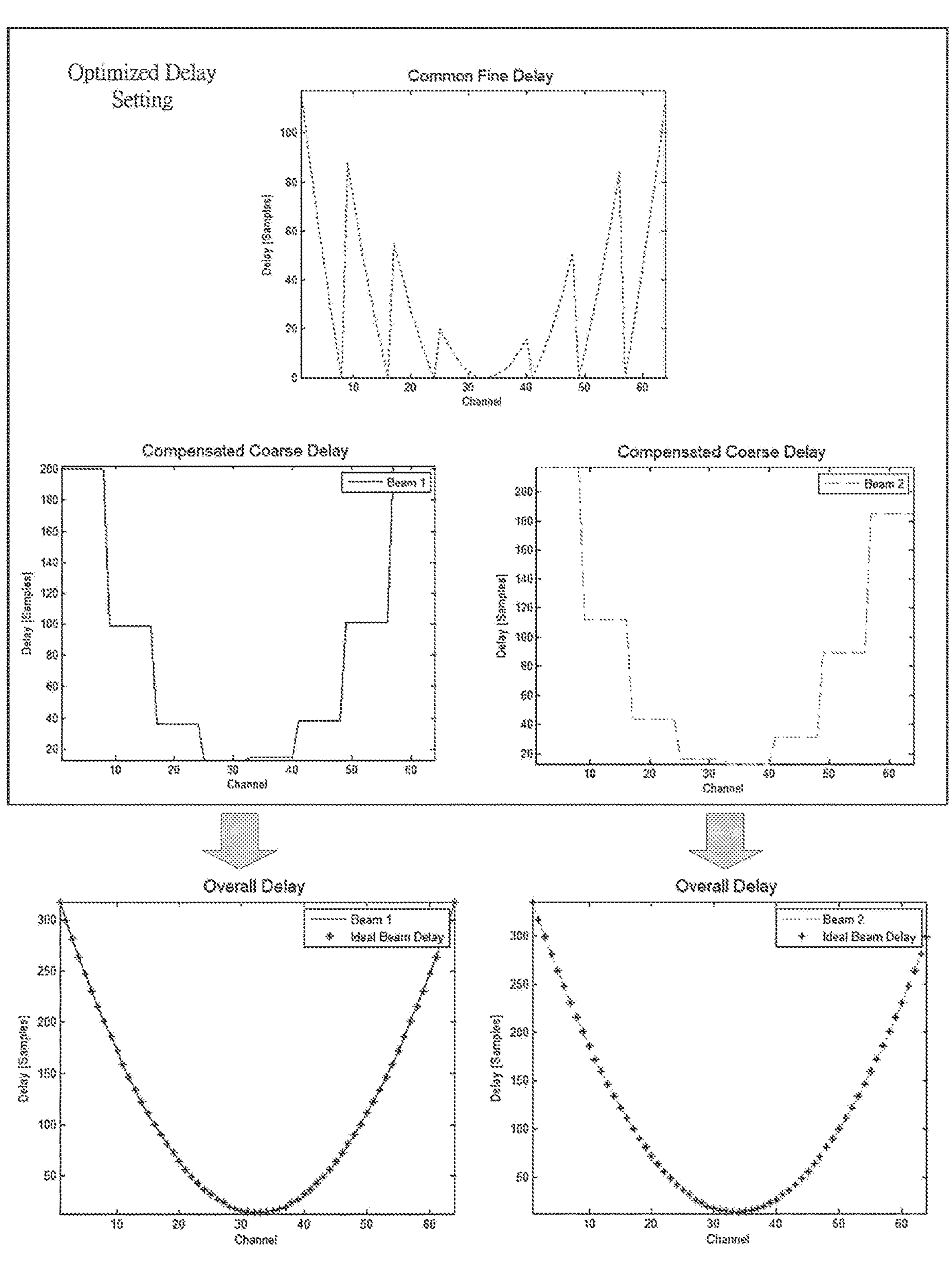
FIG. 12 shows plot diagrams of calculation results of the compensated coarse delay sets in the Dual beam condition, and shows delay diagrams showing overall delays obtained by the multi-beam calculation process and ideal beam delays for the Dual beam condition according to one embodiment of the present disclosure.

Reference can be made to FIG. 12, which shows plot diagrams of calculation results of the compensated coarse delay sets in the Dual beam condition, and shows delay diagrams showing overall delays obtained by the multi-beam calculation process and ideal beam delays for the Dual beam condition according to one embodiment of the present disclosure. In FIG. 11, after the common fine delay set and the compensated coarse delay sets are obtained and applied, overall delays of Beam 1 and Beam 2 can be obtained.

Compared with the ideal beam delays of Beam 1 and Beam 2, it can be seen from FIG. 12 that the overall delays are pretty close to the ideal delays of Beam 1 and Beam 2.

Referring to the following Table I, a simplified example for calculating an optimized delay setting is shown.

TABLE I

| | Group | | | | | | | | | | | |
|---|---|---|---|---|---|---|---|---|---|---|---|---|
| | Channel Group 1 | | | | | | Channel Group 2 | | | | | |
| | Beam # | | | | | | | | | | | |
| | Beam 1 | | | Beam 2 | | | Beam 1 | | | Beam 2 | | |
| Channels | CH1 | CH2 | CH3 | CH1 | CH2 | CH3 | CH4 | CH5 | CH6 | CH4 | CH5 | CH6 |
| Ideal Delay | 1 | 2 | 2 | 7 | 9 | 10 | 10 | 12 | 14 | 21 | 22 | 26 |
| Fine Delay | 0 | 1 | 1 | 0 | 2 | 3 | 0 | 2 | 4 | 0 | 1 | 5 |
| Coarse Delay | | 1 | | | 7 | | | 10 | | | 21 | |
| Common Fine Delay | 0 | 1.5 | 2 | 0 | 1.5 | 2 | 0 | 1.5 | 4.5 | 0 | 1.5 | 4.5 |
| Compensated Coarse Delay | | 0.5 | | | 7.5 | | | 10 | | | 21 | |
| Effective Delay | 0.5 | 2 | 2.5 | 7.5 | 9 | 9.5 | 10 | 11.5 | 14.5 | 21 | 22.5 | 25.5 |

Therefore, as shown in FIG. 9, the common fine delay set and the compensated coarse delay sets corresponding to the different output beam signals can be optimized according to the different scan ranges and the hardware specification of the transducer elements, so as to establish the lookup table, and the controller unit 14 can be configured to apply the compensated coarse delay sets by controlling the coarse delay beamformers according to the lookup table.

In more detail, before ultrasonic scans are performed, the lookup table can be updated, such that the controller unit 14 can configure the common fine delay beamformer and the coarse delay beamformers according to the lookup table. Settings in the lookup table are used to applied corresponding delay and perform summation operations according to timing of the echo signals, so as to complete the dynamic receive focusing process for the multi-beam conditions.

Step S704: configuring multiple ones of the second summation unit to perform second summation operations on the corresponding delayed first summation signals, so as to generate a plurality of output beam signals.

As shown in FIG. 2, the image processing unit 15 can be an image processor connected to the multiple ones of the second summation unit S2 and the display device 16, and is used process the output beam signals into image data.

Step S705: configuring the image processing unit to receive the output beam signals, and to process and convert the output beam signals into image data, and transmit the image data to the display device for displaying an ultrasonic imaging result.

In some embodiments, as shown in FIG. 2, the common fine delay beamformer 110 can be implemented by an analog circuit, and output of the common fine delay beamformer 110 (i.e., first summation signals) can be converted from analog signals to digital signals through an analog-to-digital converter (ADC) 112, and operations of the coarse delay beamformers 111 subsequent signal processing can be implemented by a DSP or a CPU for image processing, so as to achieve miniaturization for the multi-beam beamforming system.

Beneficial Effects of the Embodiments

In conclusion, in the ultrasonic imaging system and the ultrasonic imaging method provided by the present disclosure, a system architecture that combines single common fine delay beamformer with multiple coarse delay beamformers is utilized, such that multiple output beam signals can be simultaneously generated by adjusting a common fine delay set and assigning compensated coarse delays for each of the beam signals, thereby decreasing an architecture complexity for multi-line beamforming system without adding more micro-beamformers, so as to achieve miniaturization.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An ultrasonic imaging system, comprising:

a transmitting beamformer;

a receiving beamformer;

a plurality of transducer elements corresponding to a plurality of receiving channels and selectively connected to the transmitting beamformer or the receiving beamformer;

a controller circuit connected to the transmitting beamformer and the receiving beamformer;

wherein, in a transmitting process, the controller circuit is configured to control the transmitting beamformer to transmit a plurality of ultrasonic sound signals that focus at scan depths through the transducer elements;

wherein the receiving beamformer is configured to generate a plurality of output beam signals and includes:

a common fine delay beamformer including a plurality of channel groups, each of the plurality of channel groups corresponding to a part of the receiving channels and including a plurality of fine delay circuits and a first summation unit;

a plurality of coarse delay beamformers respectively corresponding to the output beam signals and each including:

a plurality of coarse delay circuits connected to multiple ones of the first summation unit; and a second summation unit connected to the coarse delay circuits;

wherein, in the receiving process, echo signals of the ultrasonic sound signal are received at the transducer elements and sent to the channel groups, the controller circuit applies a common fine delay set to the echo signals by controlling the common fine delay beamformer, multiple ones of the first summation unit perform first summation operations on the corresponding echo signals to generate a plurality of first summation signals, the controller circuit applies a plurality of compensated coarse delay sets to the first summation signals by controlling the coarse delay beamformers, and multiple ones of the second summation unit perform second summation operations the corresponding delayed first summation signals to generate a plurality of output beam signals, wherein the controller circuit is further configured to perform a multi-beam calculation process to determine the common fine delay set, wherein the multi-beam calculation process includes:

obtaining a plurality of ideal delays for each of the output beam signals according to the scan depths and a hardware configuration of the plurality of transducer elements;

obtaining a plurality of coarse delays for each channel group according to an equation (1):

$$\text{CoarseDelay}(k) \le \min\{\text{BeamformDelay}(1), \ldots, \text{BeamformDelay}(n)\} \quad \text{equation (1)},$$

wherein n is a channel number of the receiving channel of a kth one of the channel groups, CoarseDelay (k) is the coarse delay of the kth one of the channel groups, BeamformDelay (n) is the ideal delay of the nth one of the receiving channels, and k and n are integers equal to or larger than 1;

obtaining a plurality of fine delays of the plurality of receiving channels according to an equation (2):

$$\text{FineDelay}(n) = \text{BeamformDelay}(n) - \text{CoarseDelay}(k) \quad \text{equation (2)},$$

wherein FineDelay (n) is the fine delay of the nth of the receiving channels;

obtaining the common fine delay set according to an equation (3):

$$\text{CommonFineDelay}(n) = f(\text{FineDelay}_{Beam\_1}(n), \text{FineDelay}_{Beam\_2}(n), \ldots, \text{FineDelay}_{Beam\_x}(n)), \text{ where } \min(\text{FineDelay}_{Beam\_1}(n), \text{FineDelay}_{Beam\_2}(n), \ldots, \text{FineDelay}_{Beam\_x}) \le f(\text{FineDelay}_{Beam\_1}(n), \text{FineDelay}_{Beam\_2}(n), \ldots, \text{FineDelay}_{Beam\_x}) \le \max(\text{FineDelay}_{Beam\_1}(n), \text{FineDelay}_{Beam\_2}(n), \ldots, \text{FineDelay}_{Beam\_x}) \quad \text{equation (3)},$$

wherein CommonFineDelay (n) is a common fine delay of nth one of the receiving channels, $\text{FineDelay}_{Beam\_1}$ (n), $\text{FineDelay}_{Beam\_2}$ (n), . . . , $\text{FineDelay}_{Beam\_x}$ (n) are the fine delays of nth one of the receiving channels of first to xth ones of the output beam signals, and f(.) is a linear function or non-linear function, x is an integer equals to or larger than 1, the common fine delay set includes CommonFineDelay (1), CommonFineDelay (2), . . . , CommonFineDelay (j), and j is a quantity of the receiving channels.

2. The ultrasonic imaging system according to claim 1, wherein the controller circuit is further configured to perform the multi-beam calculation process to determine the plurality of compensated coarse delay sets, and the multi-beam calculation process further includes:

obtaining mean values of fine delay errors of the plurality of channel groups for each of the output beam signals according to an equation (4):

$$\text{MeanOfFineDelayError}_{Beam\_x}(k) = \text{mean}\{\text{FineDelay}_{Beam\_x}(n) - \text{CommonFineDelay}(n)\} \quad \text{equation (4)},$$

wherein $\text{MeanOfFineDelayError}_{Beam\_x}$ (k) is the mean value of the kth one of the channel groups of the xth one of the output beam signals;

obtaining the plurality of compensated coarse delay sets corresponding to the output beam signals according to an equation (5):

$$CompensatedCoarseDelay_{Beam\_x}(k) = CoarseDelay_{Beam\_x}(k) + MeanOfFineDelayError_{Beam\_x}(k) \quad \text{equation (5)},$$

wherein $CompensatedCoarseDelay_{Beam\_x}$ (k) is a compensated coarse delay of the kth one of the channel groups corresponding to the xth one of the output beam signals, and the compensated coarse delay set corresponding to the xth one of the output beam signals includes $CompensatedCoarseDelay_{Beam\_x}$ (1), $CompensatedCoarseDelay_{Beam\_x}$ (2), . . . , $CompensatedCoarseDelay_{Beam\_x}$ (q), where q is a quantity of the channel groups.

3. The ultrasonic imaging system according to claim 2, wherein the common fine delay set and the plurality of compensated coarse delay sets corresponding to the different output beam signals are obtained according to a plurality of different scan ranges and a hardware specification of the transducer elements, so as to establish a lookup table, and the controller circuit is configured to apply the common fine delay set and the compensated coarse delay sets by controlling the common fine delay beamformer and the coarse delay beamformers according to the lookup table.

4. The ultrasonic imaging system according to claim 1, further comprising:

a switch circuit configured to be controlled by the controller circuit, so as to connect the plurality of transducer elements to the transmitting beamformer in the transmitting process, and to connect the transducer elements to the receiving beamformer in the receiving process.

5. The ultrasonic imaging system according to claim 4, wherein the switch circuit includes:

a plurality of multiplexers each connected to one or more transducer elements; and a plurality of transmitting and receiving switches connected to the plurality of multiplexers, respectively, wherein each of the transmitting and receiving switches provides a transmitting channel to the transmitting beamformer and one of the receiving channels to the receiving beamformer, and is controlled by the controller circuit to selectively connect the corresponding multiplexer to the transmitting beamformer in the transmitting process or to the receiving beamformer in the receiving process.

6. The ultrasonic imaging system according to claim 1, further comprising:

a display device; and an image processing unit connected to the multiple ones of the second summation unit and the display device, wherein the image processing unit receives the output beam signals, and is configured to process and convert the output beam signals into image data and transmit the image data to the display device for displaying an ultrasonic imaging result.

7. An ultrasonic imaging method, suitable for the ultrasonic imaging system including a transmitting beamformer, a receiving beamformer, a plurality of transducer elements corresponding to a plurality of receiving channels and selectively connected to the transmitting beamformer or the receiving beamformer, and a controller circuit connected to the transmitting beamformer and the receiving beamformer, the ultrasonic imaging method comprising:

configuring the controller circuit to, in a transmitting process, control the transmitting beamformer to transmit a plurality of ultrasonic sound signals that focus at scan depths through the transducer elements, wherein the receiving beamformer includes:

a common fine delay beamformer including a plurality of channel groups, each of the plurality of channel groups corresponding to a part of the receiving channels and including a plurality of fine delay circuits and a first summation unit;

a plurality of coarse delay beamformers respectively corresponding to the output beam signals and each including:

a plurality of coarse delay circuits connected to multiple ones of the first summation unit; and a second summation unit connected to the coarse delay circuits;

configuring the transducer elements to, in a receiving process, receive echo signals of the ultrasonic sound signals and send the echo signals to the channel groups;

configuring the controller circuit to apply a common fine delay set to the echo signals by controlling the common fine delay beamformer;

configuring multiple ones of the first summation unit to perform first summation operations on the corresponding echo signals to generate a plurality of first summation signals;

configuring the controller circuit to apply a plurality of compensated coarse delay sets to the first summation signals by controlling the coarse delay beamformers;

configuring multiple ones of the second summation unit to perform second summation operations on the corresponding delayed first summation signals, so as to generate a plurality of output beam signals;

configuring the controller circuit to perform a multi-beam calculation process to determine the common fine delay set, wherein the multi-beam calculation process includes:

obtaining a plurality of ideal delays for each of the output beam signals according to the scan depths and a hardware configuration of the plurality of transducer elements;

obtaining a plurality of coarse delays for each channel group according to an equation (1):

$$CoarseDelay(k) \le \min\{BeamformDelay(1), \ldots, BeamformDelay(n)\} \quad \text{equation (1)},$$

wherein n is a channel number of the receiving channel of a kth one of the channel groups, CoarseDelay (k) is the coarse delay of the kth one of the channel groups, BeamformDelay (n) is the ideal delay of the nth one of the receiving channels, and k and n are integers equal to or larger than 1;

obtaining a plurality of fine delays of the plurality of receiving channels according to an equation (2):

$$FineDelay(n) = BeamformDelay(n) - CoarseDelay(k) \quad \text{equation (2)},$$

wherein FineDelay (n) is the fine delay of the nth of the receiving channels;

obtaining the common fine delay set according to an equation (3):

$$CommonFineDelay(n) = f(FineDelay_{Beam\_1}(n), FineDelay_{Beam\_2}(n), \ldots, FineDelay_{Beam\_x}(n)),$$
$$\text{where } \min(FineDelay_{Beam\_1}(n), FineDelay_{Beam\_2}(n), \ldots, FineDelay_{Beam\_x}) \le f(FineDelay_{Beam\_1}(n), FineDelay_{Beam\_2}(n), \ldots, FineDelay_{Beam\_x}) \le \max(FineDelay_{Beam\_1}(n), FineDelay_{Beam\_2}(n), \ldots, FineDelay_{Beam\_x}) \quad \text{equation (3)},$$

wherein CommonFineDelay (n) is a common fine delay of nth one of the receiving channels, $FineDelay_{Beam\_1}$ (n), $FineDelay_{Beam\_2}$ (n), . . . , $FineDelay_{Beam\_x}$ (n) are the fine delays of nth one of the receiving channels of first to xth ones of the output beam signals, and f(.) is a linear function or non-linear function, x is an integer equals to or larger than 1, the common fine delay set includes CommonFineDelay (1), CommonFineDelay (2), . . . , CommonFineDelay (j), and j is a quantity of the receiving channels.

8. The ultrasonic imaging method according to claim 7, further comprising:

configuring the controller to perform the multi-beam calculation process to determine the plurality of compensated coarse delay sets, and the multi-beam calculation process further includes:

obtaining mean values of fine delay errors of the plurality of channel groups for each of the output beam signals according to an equation (4):

$$MeanOfFineDelayError_{Beam\_x}(k)=mean\{FineDelay_{Beam\_x}(n)-CommonFineDelay(n)\} \quad \text{equation (4),}$$

wherein $MeanOfFineDelayError_{Beam\_x}$ (k) is the mean value of the kth one of the channel groups of the xth one of the output beam signals;

obtaining the plurality of compensated coarse delay sets corresponding to the output beam signals according to an equation (5):

$$CompensatedCoarseDelay_{Beam\_x}(k)=CoarseDelay_{Beam\_x}(k)+MeanOfFineDelayError_{Beam\_x}(k) \quad \text{equation (5),}$$

wherein $CompensatedCoarseDelay_{Beam\_x}$ (k) is a compensated coarse delay of the kth one of the channel groups corresponding to the xth one of the output beam signals, and the compensated coarse delay set corresponding to the xth one of the output beam signals includes $CompensatedCoarseDelay_{Beam\_x}$ (1), $CompensatedCoarseDelay_{Beam\_x}$ (2), . . . , $CompensatedCoarseDelay_{Beam\_x}$ (q), where q is a quantity of the channel groups.

9. The ultrasonic imaging method according to claim 8, wherein the common fine delay set and the plurality of compensated coarse delay sets corresponding to the different output beam signals are obtained according to a plurality of different scan ranges and a hardware specification of the transducer elements, so as to establish a lookup table, and the controller unit circuit is configured to apply the common fine delay set and the compensated coarse delay sets by controlling the common fine delay beamformer and the coarse delay beamformers according to the lookup table.

10. The ultrasonic imaging method according to claim 7, further comprising:

configuring the controller circuit to control a switch circuit to connect the plurality of transducer elements to the transmitting beamformer in the transmitting process, and to connect the transducer elements to the receiving beamformer in the receiving process.

11. The ultrasonic imaging method according to claim 10, wherein the switch circuit includes:

a plurality of multiplexers each connected to one or more transducer elements; and a plurality of transmitting and receiving switches connected to the plurality of multiplexers, respectively, wherein each of the transmitting and receiving switches provides a transmitting channel to the transmitting beamformer and one of the receiving channels to the receiving beamformer, and is controlled by the controller circuit to selectively connect the corresponding multiplexer to the transmitting beamformer in the transmitting process or to the receiving beamformer in the receiving process.

12. The ultrasonic imaging method according to claim 7, wherein the ultrasonic imaging method further includes a display device and an image processing unit connected to the multiple ones of the second summation unit and the display device, and the ultrasonic imaging method further comprises:

configuring the image processing unit to receive the output beam signals, and to process and convert the output beam signals into image data, and transmit the image data to the display device for displaying an ultrasonic imaging result.

* * * * *